US009047879B2

(12) United States Patent
Inch et al.

(10) Patent No.: US 9,047,879 B2
(45) Date of Patent: Jun. 2, 2015

(54) HIGH PERFORMANCE CARTRIDGE FORMAT

(71) Applicant: International Business Machines Corporation, Armonk, NY (US)

(72) Inventors: Randy C. Inch, Tucson, AZ (US); Kevin B. Judd, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/778,029

(22) Filed: Feb. 26, 2013

(65) Prior Publication Data

US 2014/0240868 A1    Aug. 28, 2014

(51) Int. Cl.
G11B 5/584    (2006.01)
G11B 27/36    (2006.01)
G11B 5/09     (2006.01)
G11B 5/008    (2006.01)

(52) U.S. Cl.
CPC ........ G11B 5/00821 (2013.01); G11B 5/00878 (2013.01); *G11B 2220/90* (2013.01); *G11B 27/36* (2013.01); G11B 5/584 (2013.01); G11B 5/00891 (2013.01)

(58) Field of Classification Search
None
See application file for complete search history.

(56) References Cited

U.S. PATENT DOCUMENTS 6,185,063 B1 * 2/2001 Cameron .................. 360/78.04
6,405,277 B1 * 6/2002 Jen et al. .......................... 711/4
7,593,177 B2 * 9/2009 Okafuji et al. ................. 360/48
7,859,786 B2 * 12/2010 Saliba ............................ 360/71
8,599,510 B1 * 12/2013 Fallone .......................... 360/48
2004/0156140 A1 * 8/2004 Nakamura ................. 360/77.13
2006/0215307 A1   9/2006 Yoshida et al.
2012/0014012 A1   1/2012 Holmberg
2012/0162809 A1   6/2012 Iida
2013/0335856 A1 * 12/2013 Tanabe et al. .................. 360/76

FOREIGN PATENT DOCUMENTS

EP    1 526 514 A1    4/2005
GB    2480762 A       11/2011
WO    97/08687 A1     3/1997

OTHER PUBLICATIONS

Kartik et al., "Track-Following High Frequency Lateral Motion of Flexible Magnetic Media With Sub-100 nm Positioning Error," 2011 IEEE, IEEE Transactions on Magnetics, vol. 47, No. 7, Jul. 2011, pp. 1868-1873.

* cited by examiner

Primary Examiner — Andrew L Sniezek
(74) Attorney, Agent, or Firm — Zilka-Kotab, PC

(57) ABSTRACT

A data storage system according to one embodiment includes a magnetic head, a drive mechanism for passing a magnetic medium over the magnetic head, and a controller electrically coupled to the magnetic head. The data storage system is configured to use at least two different track width formats, where which of the at least two different track width formats used by the system during reading and/or writing of data is selectable. A magnetic tape-based data storage system according to another embodiment includes a magnetic head; a drive mechanism for passing a magnetic recording tape over the magnetic head; and a controller electrically coupled to the magnetic head, wherein the system is configured to use at least two different track width formats, wherein which of the at least two different track width formats used by the system during reading and/or writing of data is selectable.

19 Claims, 14 Drawing Sheets

HIGH PERFORMANCE CARTRIDGE FORMAT

BACKGROUND

The present invention relates to data storage systems, and more particularly, this invention relates to high performance and/or high capacity cartridge formats.

In magnetic storage systems, data is read from and written onto magnetic recording media utilizing magnetic transducers. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed. Usually the tape head is designed to minimize the spacing between the head and the tape. The spacing between the magnetic head and the magnetic tape is crucial so that the recording gaps of the transducers, which are the source of the magnetic recording flux, are in near contact with the tape to effect writing sharp transitions, and so that the read element is in near contact with the tape to provide effective coupling of the magnetic field from the tape to the read element.

BRIEF SUMMARY

According to one embodiment, a data storage system includes a magnetic head, a drive mechanism for passing a magnetic medium over the magnetic head, and a controller electrically coupled to the magnetic head. The data storage system is configured to use at least two different track width formats, where which of the at least two different track width formats used by the system during reading and/or writing of data is selectable.

According to another embodiment, a magnetic tape-based data storage system includes a magnetic head, a drive mechanism for passing a magnetic recording tape over the magnetic head and a controller electrically coupled to the magnetic head. The magnetic tape-based data storage system is configured to use at least two different track width formats, where which of the at least two different track width formats used by the system during reading and/or writing of data is selectable.

According to yet another embodiment, a method of writing data to a magnetic medium, includes receiving a selection of which of at least two track width formats to use during writing of data on a magnetic medium, and writing data to the magnetic medium using the selected track width format, where a system writing the data is configured to use at least two different track width formats.

According to a further embodiment, a method of reading data from a magnetic medium, includes determining which of at least two track width formats was used during writing of data on a magnetic medium, and reading data from the magnetic medium using the determined track width format, where a system writing the data is configured to use at least two different track width formats.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of data storage systems, as well as operation and/or component parts thereof.

In one general embodiment, a data storage system includes a magnetic head, a drive mechanism for passing a magnetic medium over the magnetic head, and a controller electrically coupled to the magnetic head. The data storage system is configured to use at least two different track width formats, where which of the at least two different track width formats used by the system during reading and/or writing of data is selectable.

In another general embodiment, a magnetic tape-based data storage system includes a magnetic head, a drive mechanism for passing a magnetic recording tape over the magnetic head and a controller electrically coupled to the magnetic head. The magnetic tape-based data storage system is configured to use at least two different track width formats, where which of the at least two different track width formats used by the system during reading and/or writing of data is selectable.

In yet another general embodiment, a method of writing data to a magnetic medium, includes receiving a selection of which of at least two track width formats to use during writing of data on a magnetic medium, and writing data to the magnetic medium using the selected track width format, where a system writing the data is configured to use at least two different track width formats.

In a further general embodiment, a method of reading data from a magnetic medium, includes determining which of at least two track width formats was used during writing of data on a magnetic medium, and reading data from the magnetic medium using the determined track width format, where a system writing the data is configured to use at least two different track width formats.

Figure 1A:
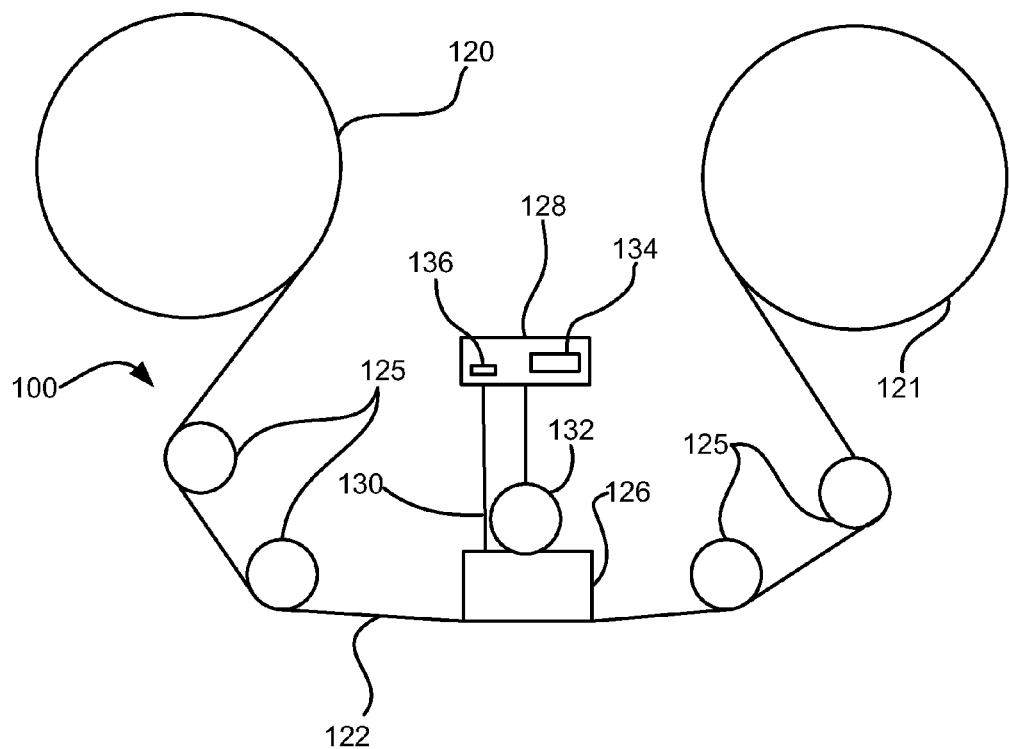
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may operate under logic known in the art, as well as any logic disclosed herein. The controller 128 may be coupled to a memory 136 of any known type, which may store instructions executable by the controller 128. Moreover, the controller 128 may be configured and/or programmable to perform or control some or all of the methodology presented herein. Thus, the controller may be considered configured to perform various operations by way of logic programmed into a chip; software, firmware, or other instructions being available to a processor; etc. and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
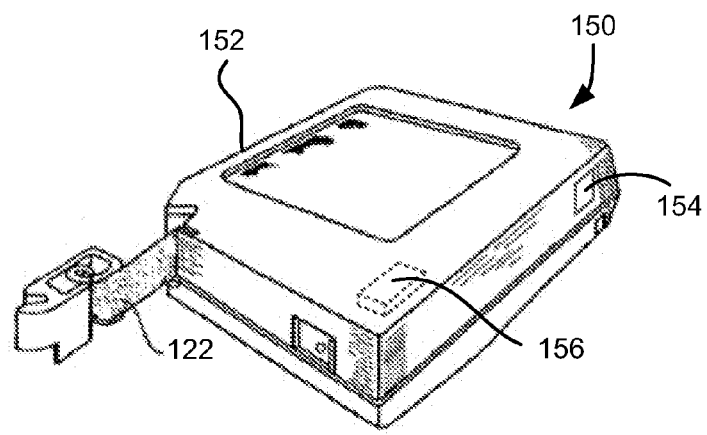
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
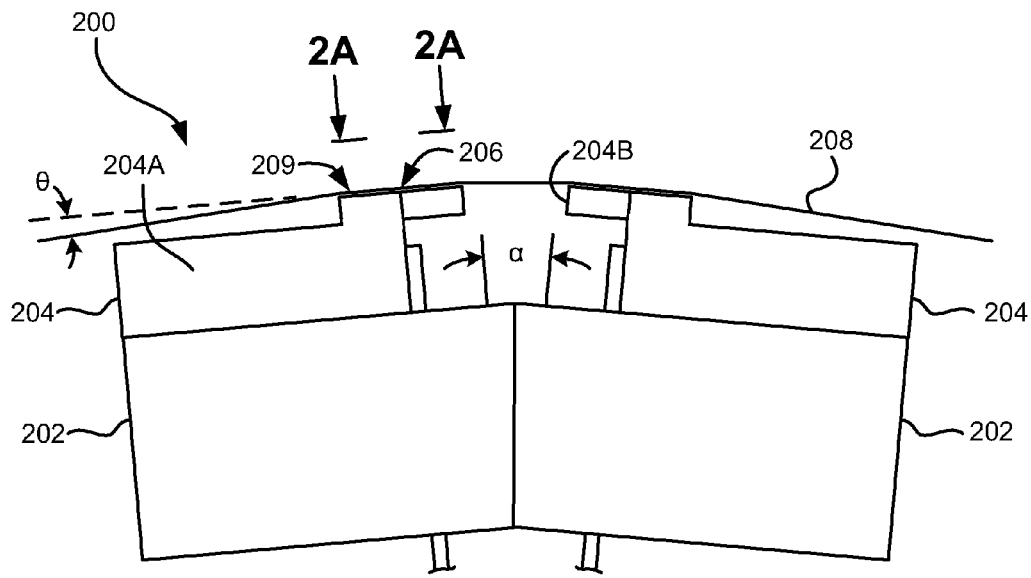
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 5 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
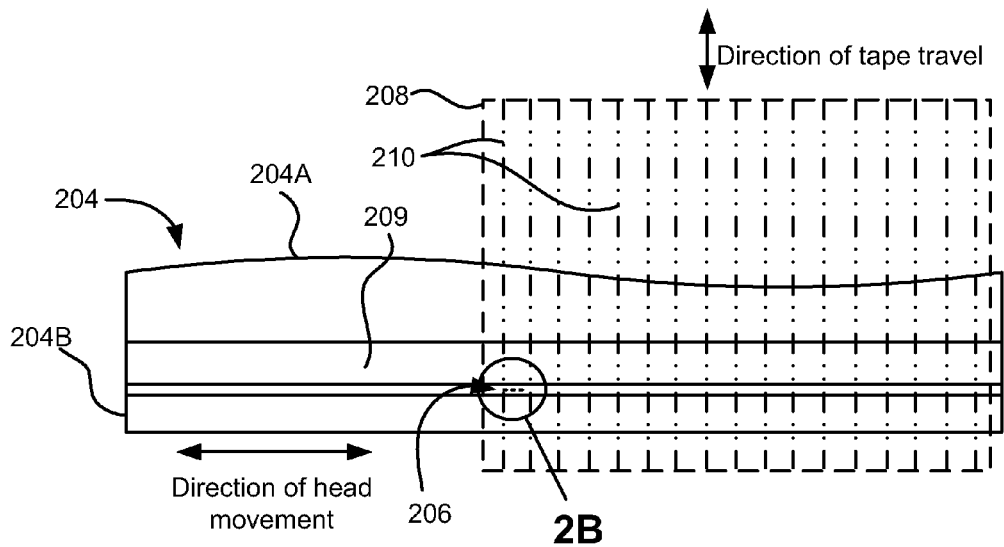
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 8 data bands and 9 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
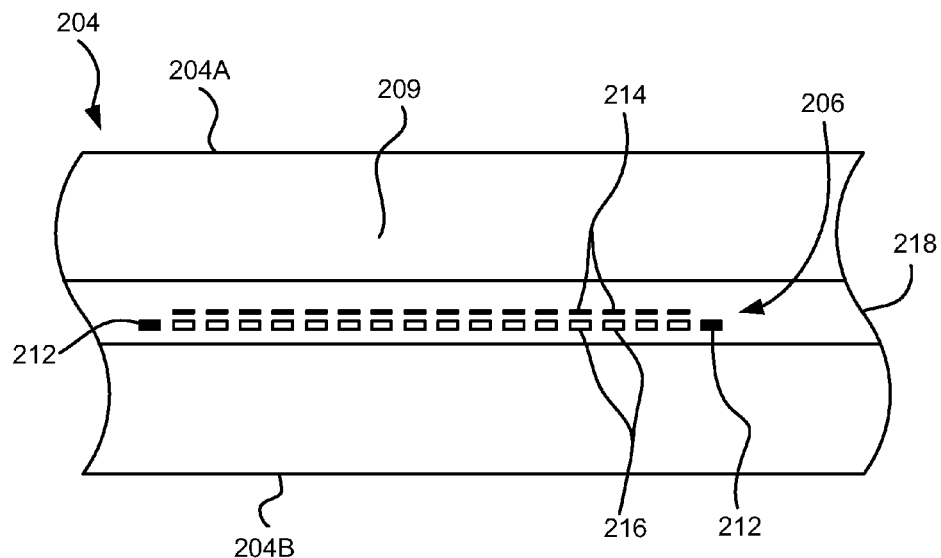
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
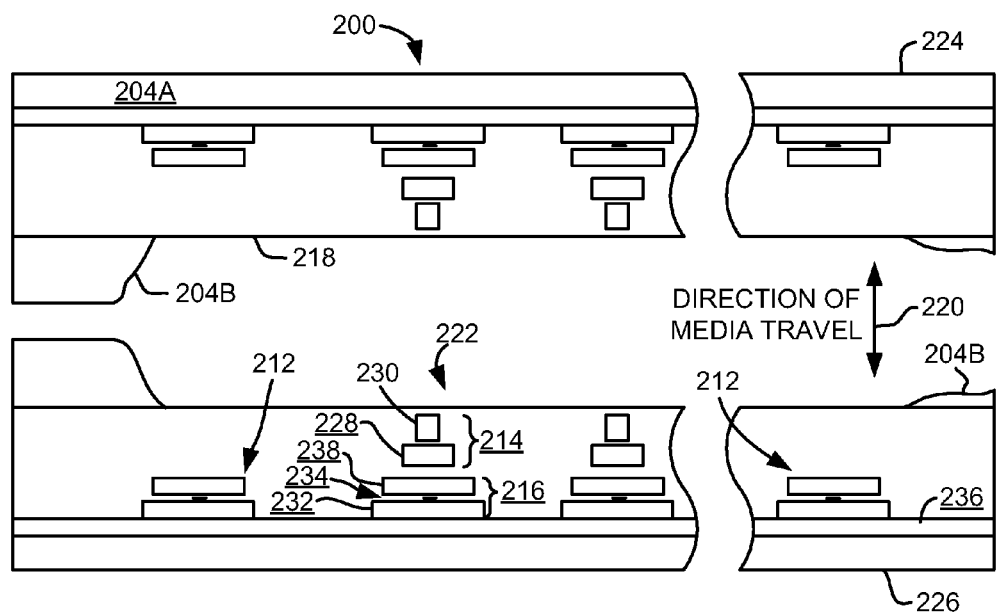
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to a direction of travel of a tape medium thereacross to form an R/W pair, exemplified by the R/W pair 222.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (−), CZT or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
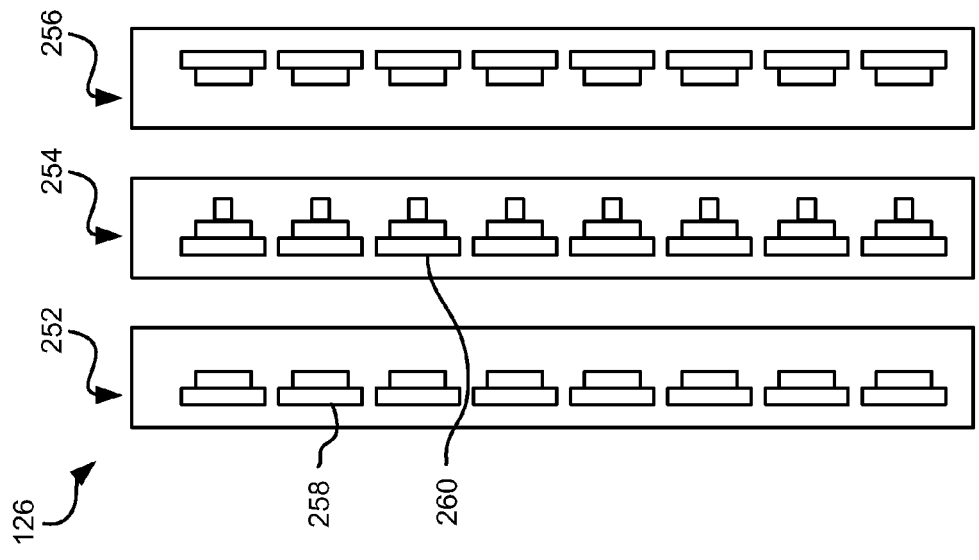
FIG. 4 is a partial tape bearing surface view of a magnetic head having a read-write-read configuration.
Figure 3:
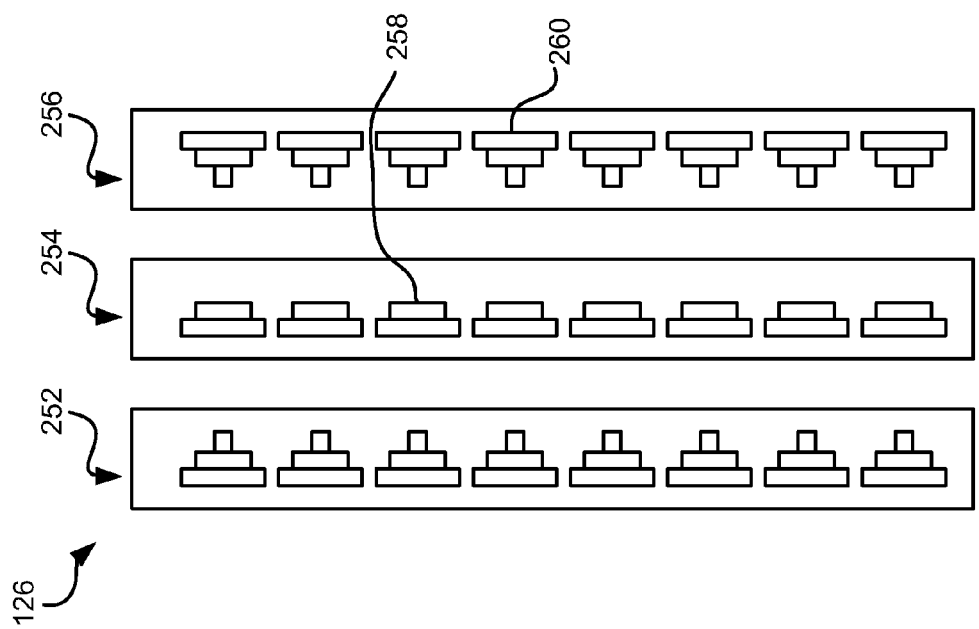
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
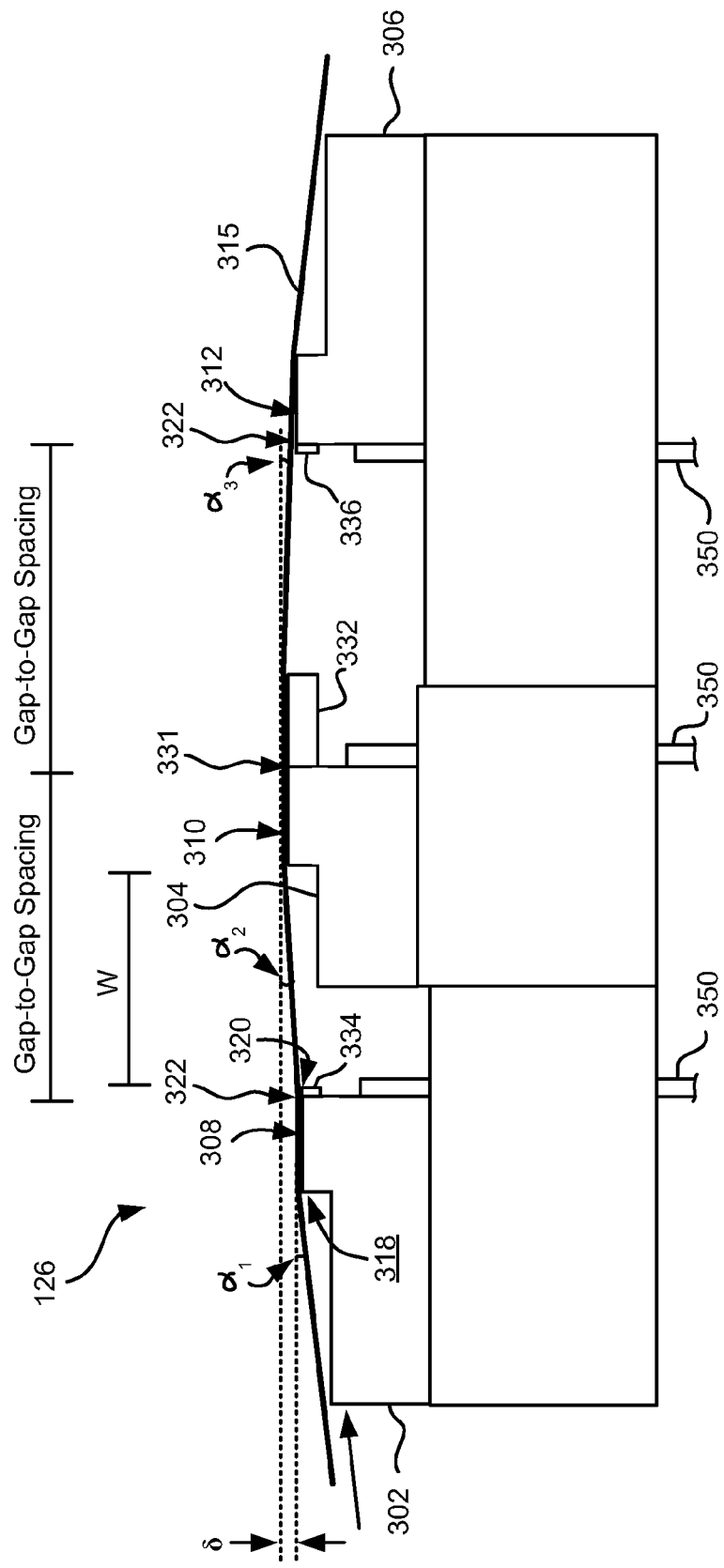
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
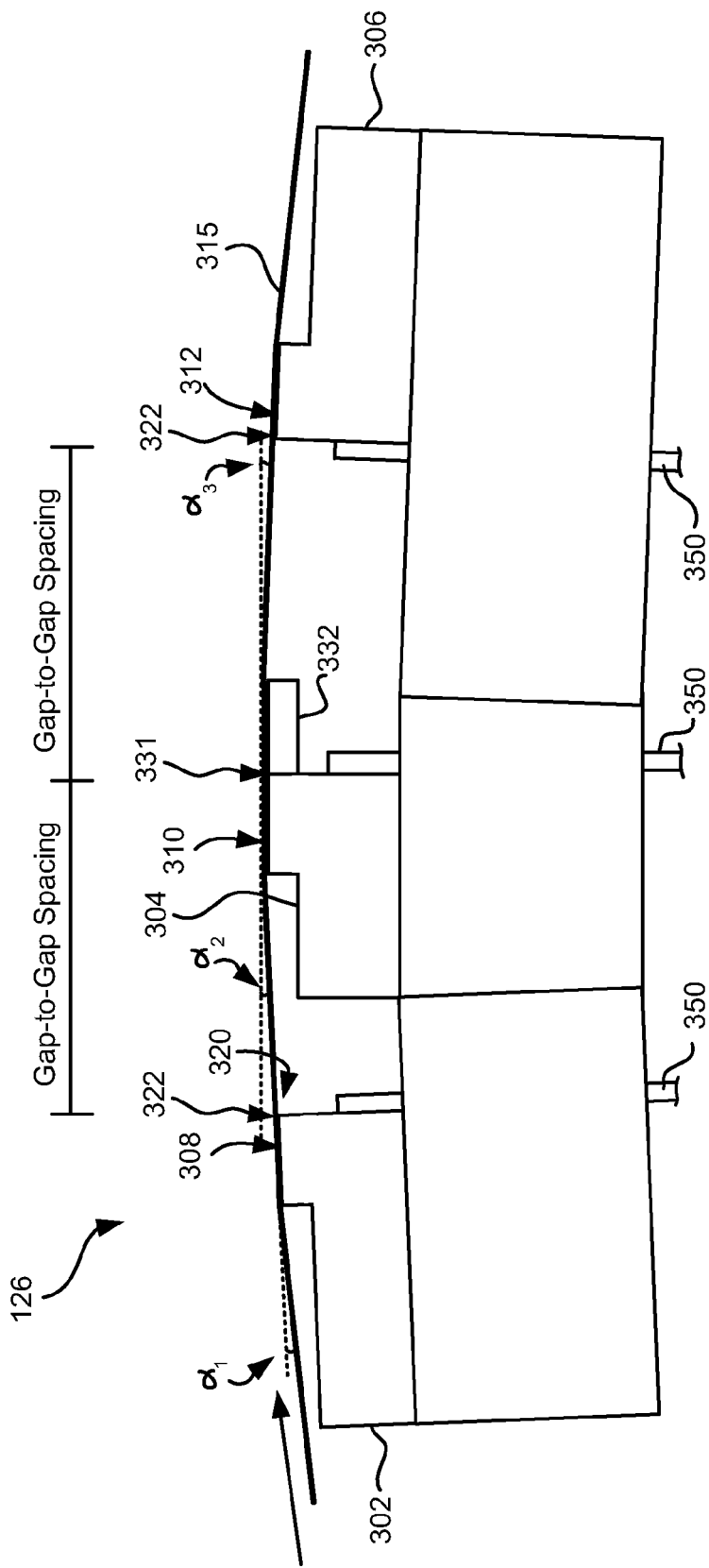
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.5° to about 1.1°, though can be any angle required by the design.

Beneficially, the inner wrap angle $\alpha_2$ may be set slightly less on the side of the module 304 receiving the tape (leading edge) than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 25-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than standard tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
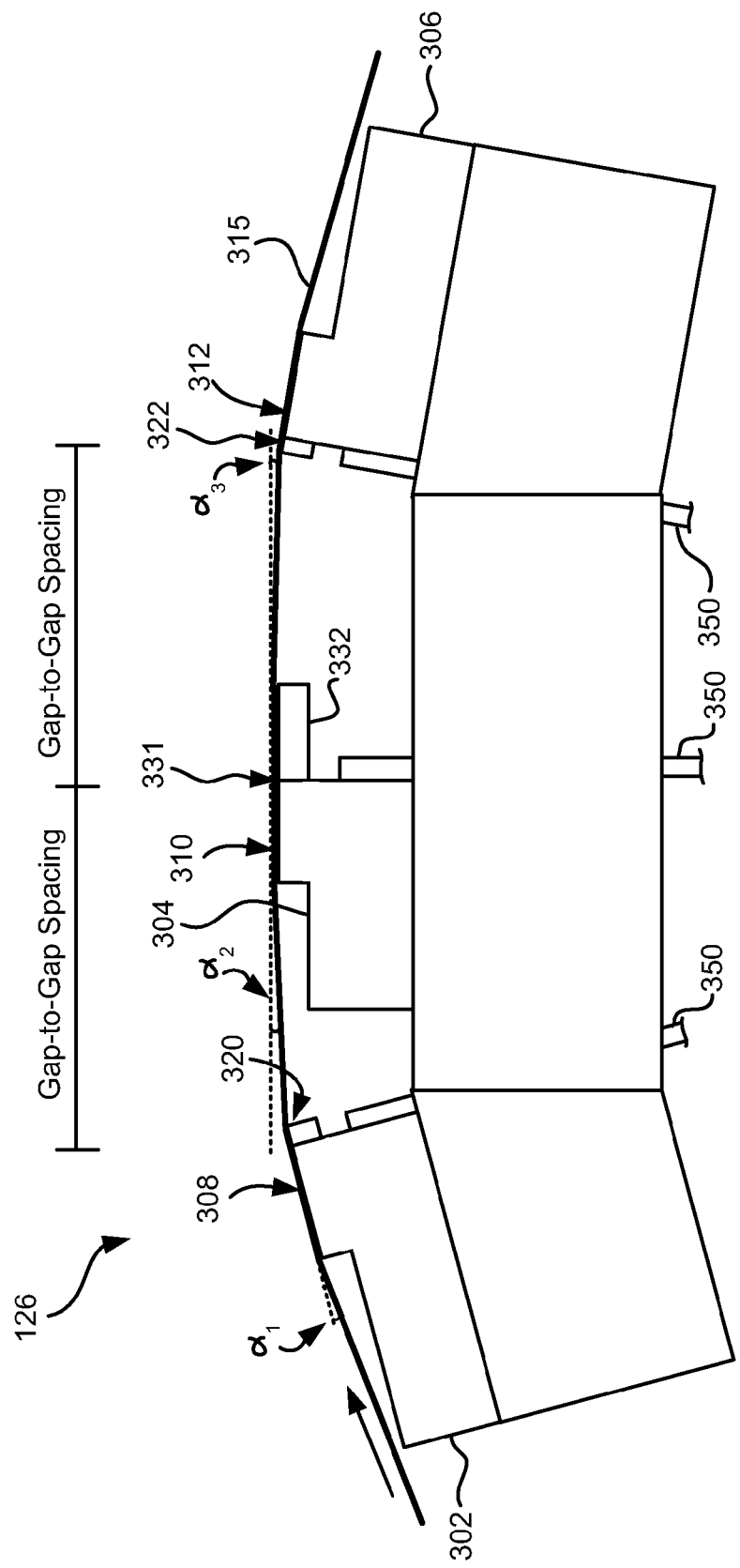
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures will force a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same pitch as current 16 channel piggyback modules, or alternatively the connections on the module may be organ-keyboarded for a 50% reduction in cable span. Over-under, writing pair unshielded cables can be used for the writers, which may have integrated servo readers.

The outer wrap angles $\alpha_1$ may be set in the drive, such as by guides of any type known in the art, such as adjustable rollers, slides, etc. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head can be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads.

In data storage systems, e.g. magnetic tape-based data storage systems, a shingling write technique may be implemented to achieve higher data storage density. With shingled track writing, data tracks are written such that each written track partially overlaps an immediately adjacent track that is contiguous to it. Thus, a first track is partially overwritten when a second track contiguous to the first is written, which in turn is partially overwritten when a third track contiguous to the second is written, and so on.

Thus, in data storage systems, it is typically necessary to determine a shingled track pitch and a reader width. The shingled track pitch (the center-to-center spacing between each track) determines the capacity, while the reader width determines how well the drive can read the written data. Track width is generally minimized to maximize capacity, whereas reader width is generally maximized to maximize reading performance. For a given reader width, the maximum capacity would be to have written tracks equal to the reader width. However, this is normally not possible due to variations in track position.

Track position variation may be due to position error signal (PES) (especially during vibration) or tape dimensional stability (TDS). Historically, the PES in a vibration environment has had the largest PES sigma, which limits the track density. Further, with regard to TDS, certain conditions (e.g. humidity, temperature, tension narrowing, etc.) may cause the width of the tape to expand or contract such that the data written on the tape is shifted in relation to its original location. Consequently, if there is too great a difference between the spacing of the written tracks on tape and the readers on the recording head, the data may not be able to be read.

Further, the written track pitch may be determined by adding these track position variations to the reader width, which often results in a written track pitch that is substantially larger than the reader width. This lowers the capacity.

Various embodiments discussed herein overcome the aforementioned drawbacks by providing at least two different track width formats. For example, in some approaches, a tape with very small track widths (a high capacity track width format) may be utilized in a controlled environment where vibration and TDS are minimal. In other approaches, a tape with large track widths (a high performance track width format) may be utilized in environments that are expected to or actually exposed to large external vibrations and/or TDS requirements.

In preferred embodiments, a track width format used by a system during the writing and/or reading of a magnetic medium may be selectable based on the environment to which the magnetic medium is exposed. For instance, in an environment with minimal external vibration and/or TDS, a high capacity track width format may be selected, such that written tracks are shingled to a get a smaller written track width, thereby maximizing track density. Alternatively, in an environment with external vibration and/or TDS variation, a high performance track width format may be selected such that data is written using larger track widths, thereby maximizing robustness to variations in track written position. Preferably, the same hardware, system, etc. may be used to generate the different track width formats in multiple environments and/or environmental conditions.

Figure 8A:
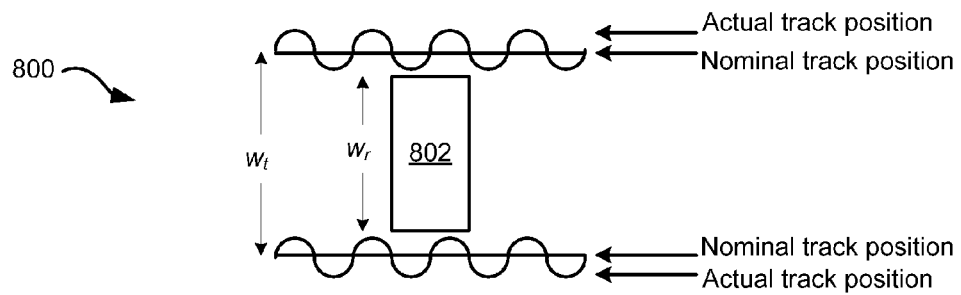
FIG. 8A illustrates a schematic diagram of a high capacity data track and read head according to one embodiment.
Figure 8B:
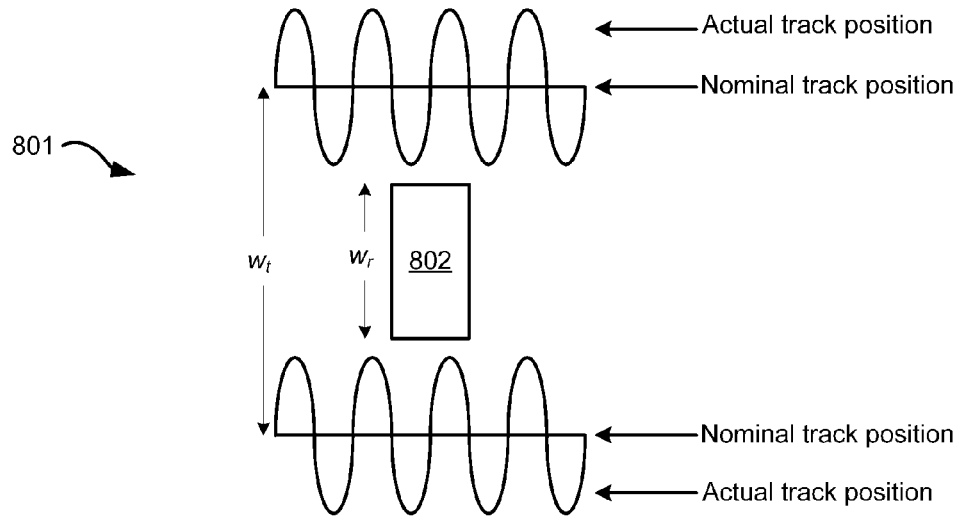
FIG. 8B illustrates a schematic diagram of a high performance data track and read head according to another embodiment.

Examples of a high capacity track width format and a high performance track width format are provided in FIGS. 8A and 8B, respectively. With regard to a high capacity track 800 as shown in FIG. 8A, the nominal track width ($w_t$) may approach (e.g. be nearly the same as) the reader 802 width ($w_r$). As also shown in FIG. 8A, the actual track position may not vary substantially from the nominal track position due to the controlled environment for vibration and/or TDS. Conversely, with regard to a track 801 written in a high performance track width format as depicted in FIG. 8B, the nominal track width ($w_t$), may vary substantially from the reader 802 width ($w_r$). Further, as also shown in FIG. 8B, the actual track position may vary substantially from the nominal track position due substantial variations in vibration and/or TDS.

According to one exemplary embodiment, a data storage system includes a magnetic head, a drive mechanism for passing a magnetic medium over the magnetic head, and a controller electrically coupled to the magnetic head. Additionally, the data storage system is configured to use at least two different track width formats. Which one of the track width formats is used by the system during reading and/or writing of data on a given medium is selectable. In some approaches, at least one of the track width formats may be selected by the user. In other approaches, at least one of the track width formats may be selected by the data storage system or other suitable device, e.g., using sensors or other logic as discussed in more detail below.

In one approach, data in a partition on the magnetic medium may be written in a first of the track width formats, while all data in a second partition of the magnetic medium may be written in a second of the track width formats. In yet another approach, the magnetic medium may be a magnetic tape.

In an additional approach, the data storage system may further include logic for storing information on the magnetic medium and/or a device coupled thereto, such as the housing, a cartridge memory, etc., which track width format at least a portion (e.g., which partitions) of the magnetic medium is written in. For example, storing which track width format at least a portion of the magnetic medium is written in may include, but is not limited to, writing said information in a cartridge memory, a header of the medium, a bar code on a cartridge, a system or library database, etc.

In a further approach, the data storage system may also include logic for determining which track width format a previously-written magnetic medium is written in. For instance, determining which track width format a previously-written magnetic medium is written in may include, but is not limited to, reading a cartridge memory, reading a header of a tape, looking up/reviewing a system or library database, reading data associated with a bar code on a cartridge, etc.

Figure 8C:
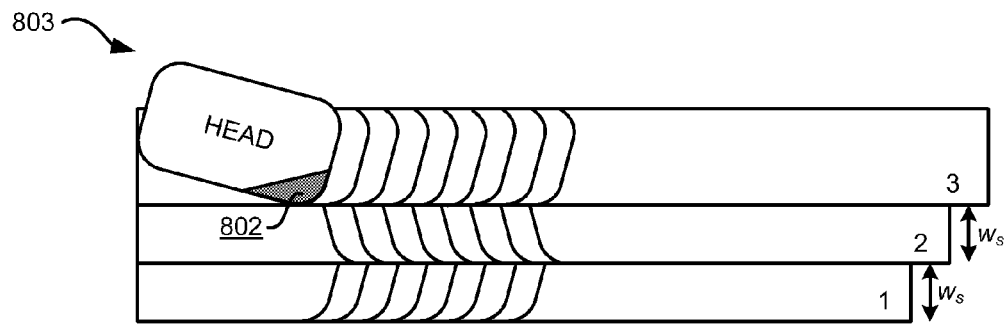
FIG. 8C illustrates a schematic diagram of shingled data tracks according to yet another embodiment.

Additionally, according to one approach, at least one of the track width formats used for reading and/or writing data on the magnetic medium may be established by a shingling distance of adjacent tracks. The shingling distance ($w_s$) between adjacent shingled tracks written by a writer 803 is shown in FIG. 8C, according to one embodiment.

According to another approach, at least one of the track width formats may be selected by a user, system, etc. based on at least one environmental condition. As used herein, an environmental condition may include ambient temperature, component temperature, humidity, vibration, shock, etc., or other environmental condition as would be understood by one having skill in the art upon reading the present disclosure.

According to yet another approach, the data storage system may include logic for outputting an alert when a track width format is selected that is contrary to at least one detected environmental condition. For example, in some embodiments, the alert may be an audible and/or visual notification/warning that the selected track width format is incorrectly selected based on at least one detected environmental condition (e.g. vibrational and/or TDS environmental conditions). If such an alert is output, a user, system, etc. may change the selected track width format, or maintain the track width format.

The format to be used for writing may be selected by a user and/or a system, e.g., the data storage system or other device, based on sensor readings. Such sensor may be in a vicinity of the data storage system, coupled thereto, etc.

Vibrational environmental conditions may be detected, e.g. using known devices and/or sensors including, but not limited to, accelerometers, velocity sensors, proximity sensors, piezoelectric vibration sensors, etc. TDS environmental conditions may also be detected, e.g. using known devices and/or sensors including, but not limited to, humidity sensors, hygrometers, psychrometers, humistors, thermometers, etc.

In some embodiments, the at least one environmental condition may be detected/derived from one or more devices and/or sensors on a magnetic medium or coupled thereto; from one or more devices and/or sensors located remotely from the a magnetic medium, or any combination thereof.

In various embodiments, the at least one environmental condition (e.g. vibrational and/or TDS environmental conditions) may be detected at a given time, over a predetermined period of time, etc. For instance, the predetermined period of time and/or any interval between the time periods, may be periodic, varied, computed, received, calculated based on some criteria such as the rate at which vibrational and TDS environmental conditions change, etc. Additionally, historical environmental conditions may be logged/stored over time in a memory of any known type coupled to a magnetic medium, and/or a memory located remotely from the magnetic medium, etc.

In other embodiments, the alert may be output when a track width format is selected that is contrary to an analysis of at least one detected environmental condition. For example, the analysis of the at least one detected environmental condition may include determining whether the at least one detected environmental condition is in a predetermined range for a predetermined period of time. In some approaches, the range may be pre-set (e.g., at installation), may be determined at or after some interval based on parameters such as a historic operating temperature, humidity, vibration, etc., or any combination thereof. In other approaches, the range may include a maximum and/or minimum threshold value. In more approaches, the range may be selected to prevent any action based on a spike in the at least one detected environmental condition. As used herein, a spike may include any value that is not within the predetermined range and that persists for a time period less than the predetermined time period. For instance, where there is merely a spike in the at least one detected environmental condition and said spike does not persist for the predetermined time period, no action (e.g. outputting an alert) may be necessary.

In further approaches, the predetermined time period and/or any interval between the predetermined time periods, may be periodic, varied, computed, received, calculated based on some criteria such as the rate at which the at least one detected environmental condition changes, etc.

Additionally, in numerous approaches, the analysis of the at least one detected environmental condition may be performed by a device coupled or located remotely from the magnetic medium, such as a controller, a host, etc. The analysis of the at least one detected environmental condition may be performed by a device coupled directed to the magnetic medium, while analysis of another detected environmental condition may be performed by a device located remotely from the magnetic medium, in other approaches. Moreover, the at least one detected environmental condition may be detected by sensor coupled to the magnetic medium, and the analysis of the at least detected environmental condition may performed by a device located remotely from the magnetic medium. It is important to note that there are many combinations for the detection and/or analysis of the at least one detected environmental condition that may be created based on the embodiments described herein, as would be recognized by one having skill in the art upon reading the present disclosure.

By way of example only, in one illustrative embodiment, a user may select a high capacity track width format, where the high capacity track width format includes shingled written tracks with small track widths and high track densities. However, the environment to which the data storage system is exposed is not a controlled environment for vibration and/or TDS. Consequently, a sensor coupled to the magnetic medium may detect vibration and/or humidity above a predetermined threshold level, and thus output an alert. The user may then select to change the track width format, e.g. to a performance written track width format having larger track width to maximize robustness to variation in track writing positions.

According to another exemplary embodiment, a magnetic tape-based data storage system includes a magnetic head, a drive mechanism for passing a magnetic recording tape over the magnetic head, and a controller electrically coupled to the magnetic head. Additionally, the magnetic tape-based storage system is configured to use at least two different track width formats. Which of the track width formats is used by the system during reading and/or writing of data on the magnetic recording medium is selectable, e.g., as set forth elsewhere herein. For example, in some approaches, at least one of the track width formats may be selected by the user. In other approaches, at least one of the track width formats may be selected by the system or other suitable device as would be understood by one skilled in the art upon reading the present disclosure.

In one approach, all data in a partition on the magnetic recording tape may be written in a first of the track width formats, while all data in a second partition of the magnetic recording medium may be written in a second of the track width formats.

In yet another approach, the magnetic tape-based data storage system may further include logic for storing information on or relating to the magnetic recording tape and/or a device coupled thereto, such as the housing, a cartridge memory, etc., which track width format at least a portion (e.g., which partitions) of the magnetic recording tape is written in. For example, storing which track width format at least a portion of the magnetic recording tape is written in may include, but is not limited to, writing said information in a tape cartridge memory, a header of a magnetic recording tape, a bar code on a tape cartridge, a system or tape library database, etc.

In an additional approach, the magnetic tape-based data storage system may further include logic for determining which track width format a previously-written magnetic recording tape is written in. For instance, determining which track width format a previously-written magnetic recording tape is written in may include, but is not limited to, reading a tape cartridge memory, reading a header of a tape, looking up/reviewing a system or tape library database, reading data associated with a bar code on a tape cartridge, etc.

In a further approach, at least one of the track width formats used for reading and/or writing data on the magnetic recording tape may be established by a shingling distance of adjacent tracks.

Additionally, according to one approach, at least one of the track width formats may be selected by the magnetic tape-based storage system, a user, etc. based on at least one detected environmental condition. As used herein, an environmental condition may include ambient temperature, component temperature, humidity, vibration, shock, etc. or other environmental condition as would be understood by one having skill in the art upon reading the present disclosure.

According to another approach, the magnetic tape-based data storage system may further include logic for outputting an alert when a track width format is selected that is contrary to at least one detected environmental condition. For example, in some embodiments, the alert may be an audible and/or visual notification/warning that the selected track width format is incorrectly selected based on at least one detected environmental condition (e.g. vibrational and/or TDS environmental conditions). If such an alert is output, a user, the system, etc. may change the selected track width format, or maintain the track width format.

Vibrational environmental conditions may be detected, e.g. using known devices and/or sensors including, but not limited to, accelerometers, velocity sensors, proximity sensors, piezoelectric vibration sensors, etc. TDS environmental conditions may also be detected, e.g. using known devices and/or sensors including, but not limited to, humidity sensors, hygrometers, psychrometers, humistors, thermometers, etc.

In some embodiments, the at least one environmental condition may be detected/derived from one or more devices and/or sensors on a tape drive or a canister coupled thereto; from one or more devices and/or sensors located remotely from the tape drive, e.g. inside or outside a tape library, etc., or any combination thereof.

In various embodiments, the at least one environmental condition (e.g. vibrational and/or TDS environmental conditions) may be detected at a given time, over a predetermined period of time, etc. For instance, the predetermined period of time and/or any interval between the time periods, may be periodic, varied, computed, received, calculated based on some criteria such as the rate at which vibrational and TDS environmental conditions change, etc. Additionally, historical environmental conditions may be logged/stored over time in a memory, of any known type, of a tape drive or canister coupled thereto, and/or a memory located remotely from the tape drive, etc.

In other embodiments, the alert may be output when a track width format is selected that is contrary to an analysis of at least one detected environmental condition. For example, the analysis of the at least one detected environmental condition may include determining whether the at least one detected environmental condition is in a predetermined range for a predetermined period of time. In some approaches, the range may be pre-set (e.g., at installation), may be determined at or after some interval based on parameters such as a historic operating temperature, humidity, vibration, etc. or any combination thereof. In other approaches, the range may include a maximum and/or minimum threshold value. In more approaches, the range may be selected to prevent any action based on a spike in the at least one detected environmental condition. As used herein, a spike may include any value that is not within the predetermined range and that persists for a time period less than the predetermined time period. For instance, where there is merely a spike in the at least one detected environmental condition(s) and said spike does not persist for the predetermined time period, no action (e.g. outputting an alert) may be necessary.

In further approaches, the predetermined time period and/or any interval between the predetermined time periods, may be periodic, varied, computed, received, calculated based on some criteria such as the rate at which the at least one detected environmental condition changes, etc.

Additionally, in numerous approaches, the analysis of the at least one detected environmental condition may be performed by a tape drive, a device located remotely from the tape drive, such as a controller, a library controller, a host, etc. The analysis of a detected environmental condition may be performed by a tape drive, while analysis of another detected environmental condition may be performed by a device located remotely from the tape drive, in other approaches. Moreover, the at least one detected environmental condition may be detected by a tape drive, and the analysis of the at least detected environmental condition may performed by a device located remotely from the tape drive. It is important to note that there are many combinations for the detection and/or analysis of the at least one detected environmental condition that may be created based on the embodiments described herein, as would be recognized by one having skill in the art upon reading the present disclosure.

Figure 9:
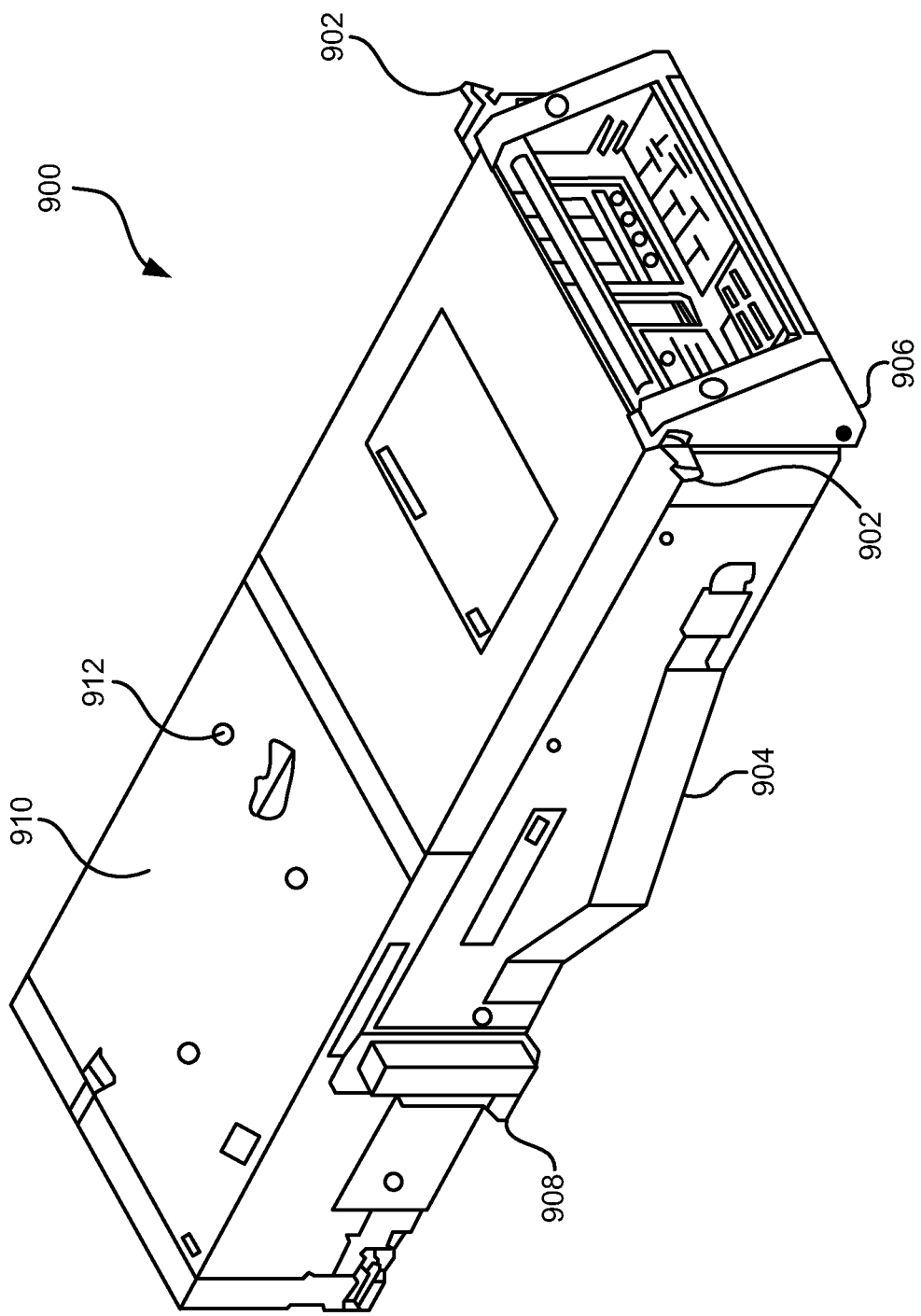
FIG. 9 illustrates a tape drive canister according to one embodiment.

As discussed above, environmental conditions, such as vibrational and TDS environmental conditions, may be detected/derived/received/analyzed from one or more sensors on a tape drive or a canister coupled thereto; and/or from one or more sensors located remotely from the tape drive, e.g., inside or outside a tape library; etc. or any combination thereof. FIG. 9 shows a rear perspective view of a tape drive canister 900 according to one embodiment. Several components 906 may be used to achieve a mechanical docking to an automated tape library. Also shown are latches 902 for mechanical docking to a tape library, a side-docking card 904 to allow mechanical docking into the tape library, a front-facing electrical docking connector 908 for electrical communication with the tape library. A tape drive brick 910 is coupled to the tape drive canister 900.

One or more sensors 912 may be located on the tape drive brick 910 (as shown in FIG. 9) and/or the tape drive canister 900 coupled thereto. In some embodiments, the one or more sensors may measure, detect, derive, etc., various environmental conditions, including but not limited to, temperature information, humidity information, etc. or any combination thereof.

Automated tape libraries are generally large storage devices that have a robotic accessor that moves tape cartridges between storage shelves and tape drives in the library. The tape drives are typically put in canisters which act as a sled or conveyance device to allow the tape drives to more easily be inserted and removed from the automated tape library as well as provide an interface for power and communications between the automated tape library and the tape drive. Very often these tape drive canisters 'hot dock' into the automated tape library such that as soon as the tape drive canister is fully seated into a slot in the automated tape library, the electrical connection is established between the tape drive canister and electronics of the automated tape library. The tape drive canisters may then be held in this 'docked' position using some physical mechanism, such as a latch, thumbscrew, catch, friction fitting, etc.

Figure 10A:
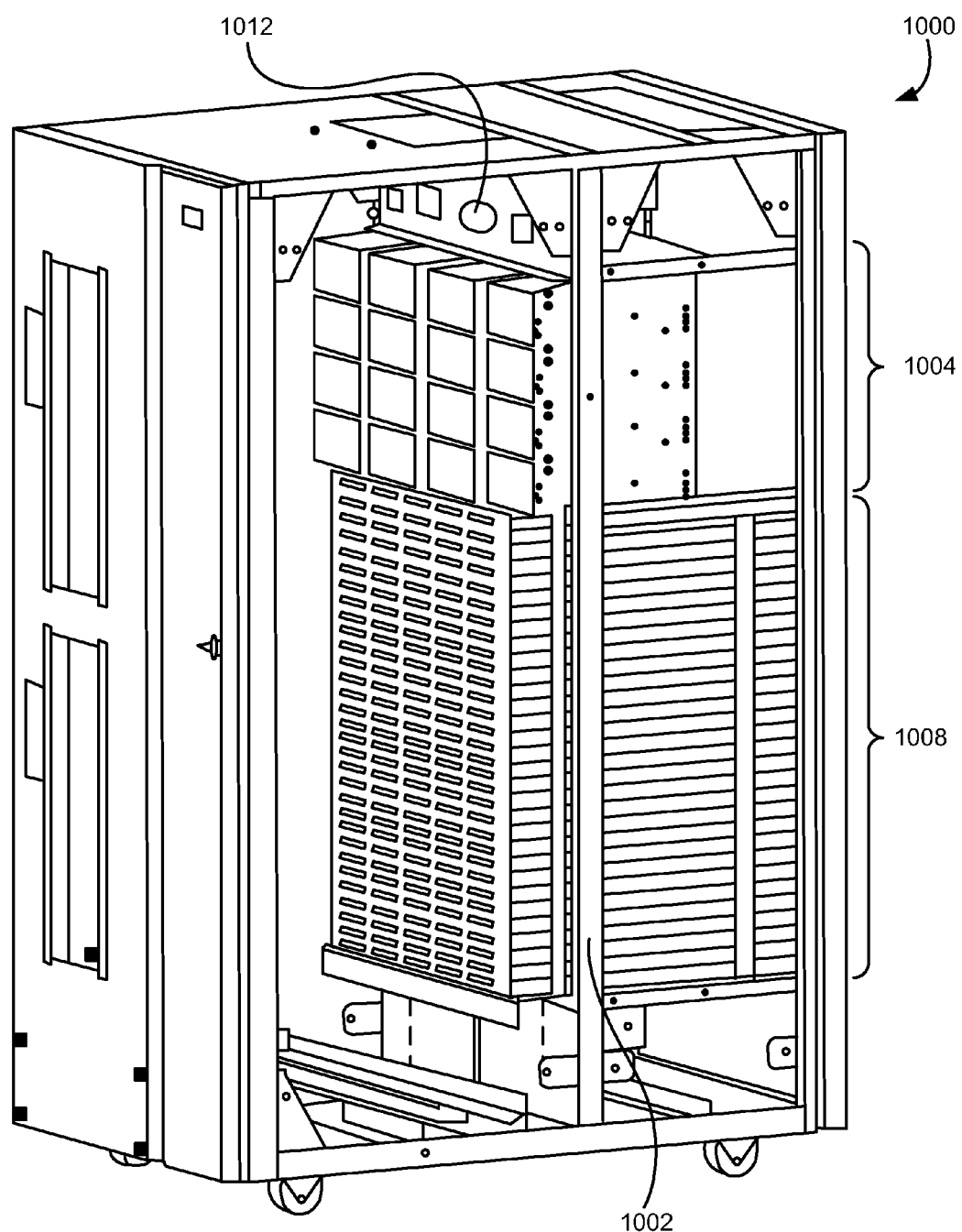
FIG. 10A-10C shows a plurality of tape drive canisters installed in a tape library according to one embodiment.

FIG. 10A is an isometric view of a tape library 1000 according to one embodiment. While no robotic accessor is shown, one is typically present for transporting tape cartridges to and from the drives, as would be understood by one skilled in the art upon reading the present description. One or more sensors 1012 may be located within the frame 1002 of the tape library 1000. In various embodiments, the one or more sensors may measure, detect, derive, etc., various environmental conditions, including but not limited to, temperature information, humidity information, etc. or any combination thereof.

Figure 10B:
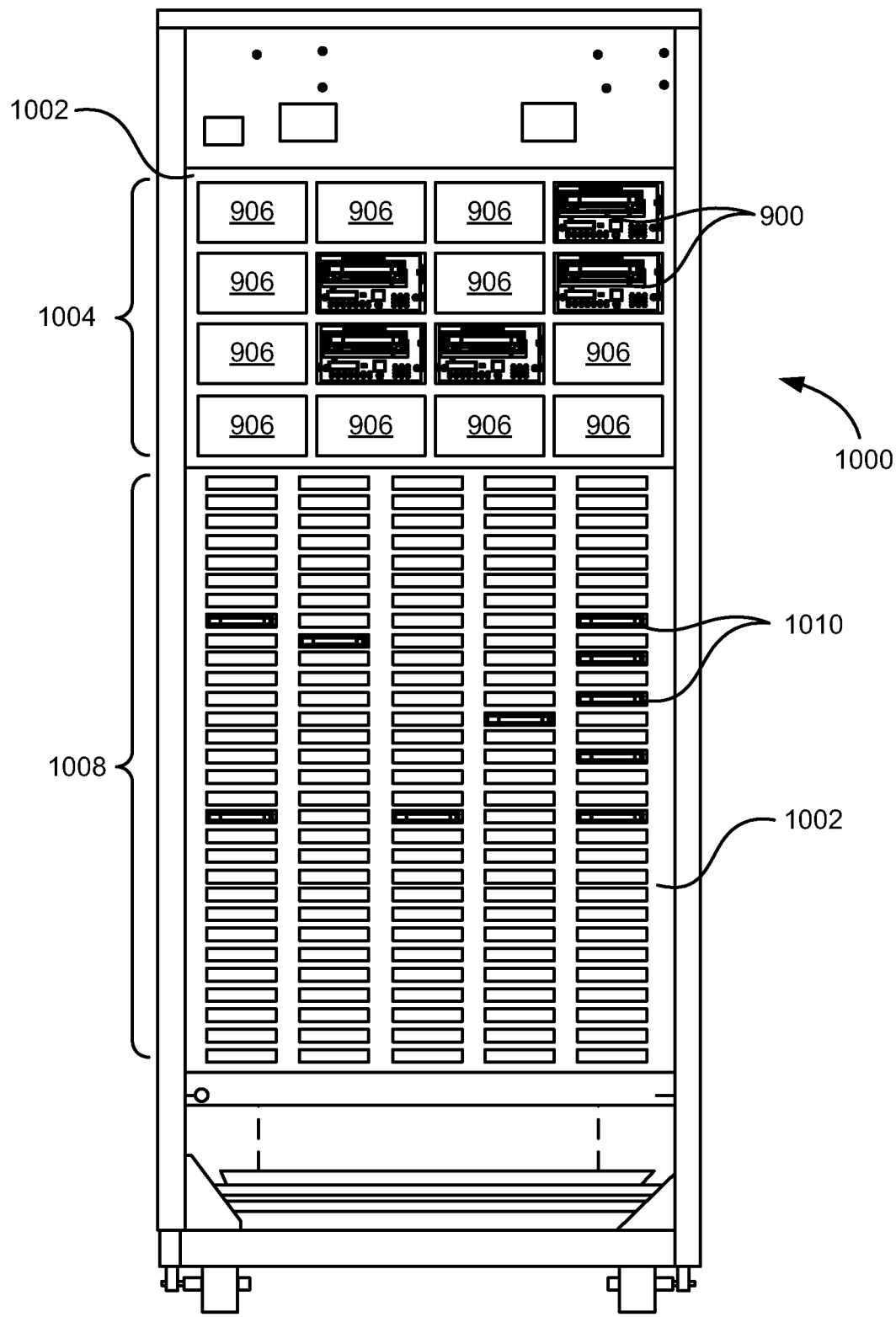

FIG. 10B is a front view of a tape library 1000 with the front door removed to better show the dense packing of tape drive canisters 900.

Figure 10C:
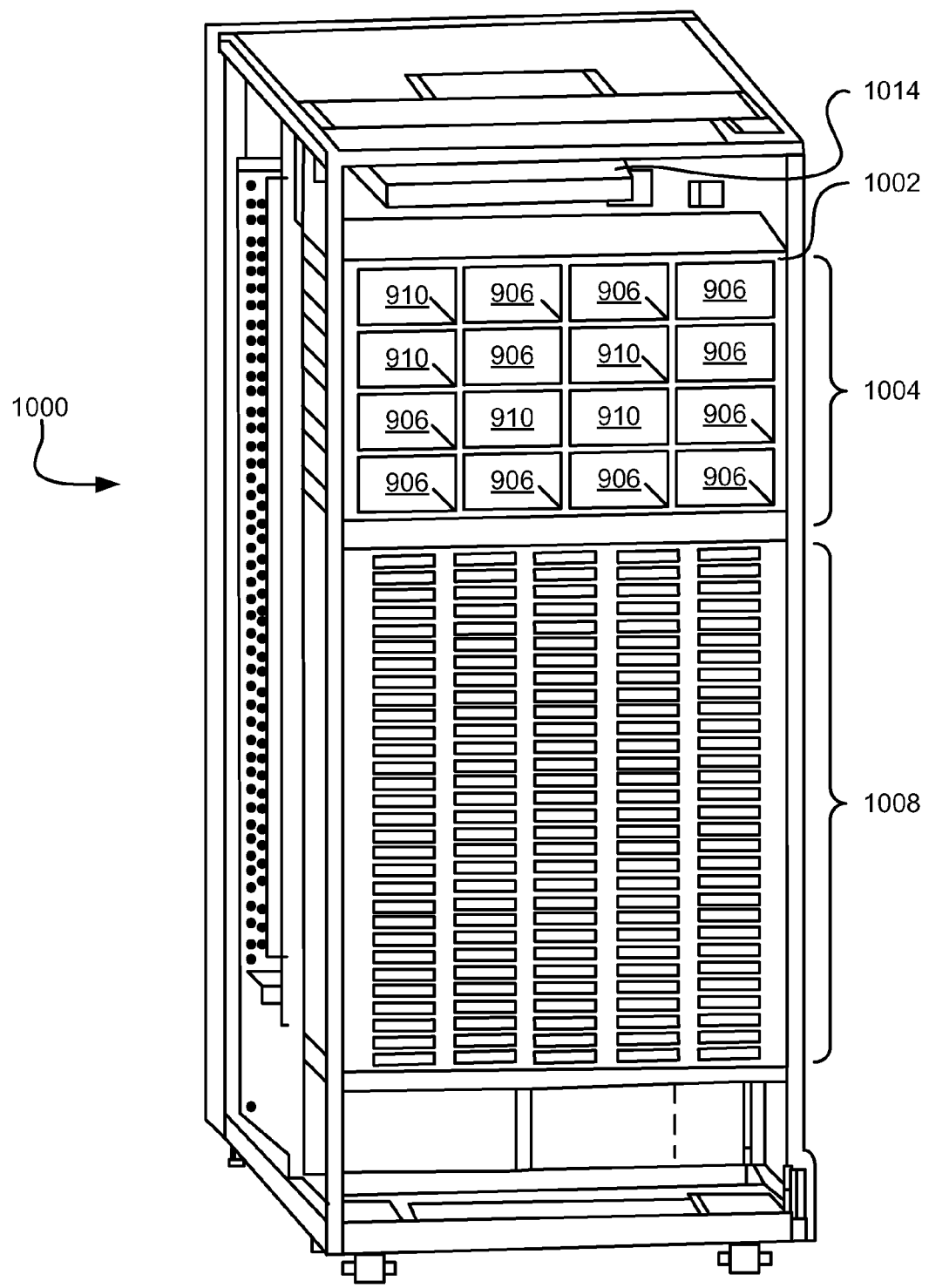

FIG. 10C shows a rear view of the tape library 1000 with the rear door removed to show the dense packing of tape drive canister bays 906 which are adapted for accepting tape drive canisters. Some tape drives 900 are shown in the bays 906. A library controller 1014 of a type known in the art may also be present. Such controller may be programmed, modified, etc. to provide aspects of the present invention.

As can be seen from FIGS. 10A-10C, the tape drive canisters 900 may be packed into the frame 1002, thereby allowing, several tape drive canisters 900 to be positioned in a tape drive canister bay array 1004 in an upper portion of the frame 1002 while a plurality of tape cartridges 1010 are capable of being stored in a plurality of tape cartridge storage shelves 1008 in a lower portion of the frame 1002.

Figure 11:
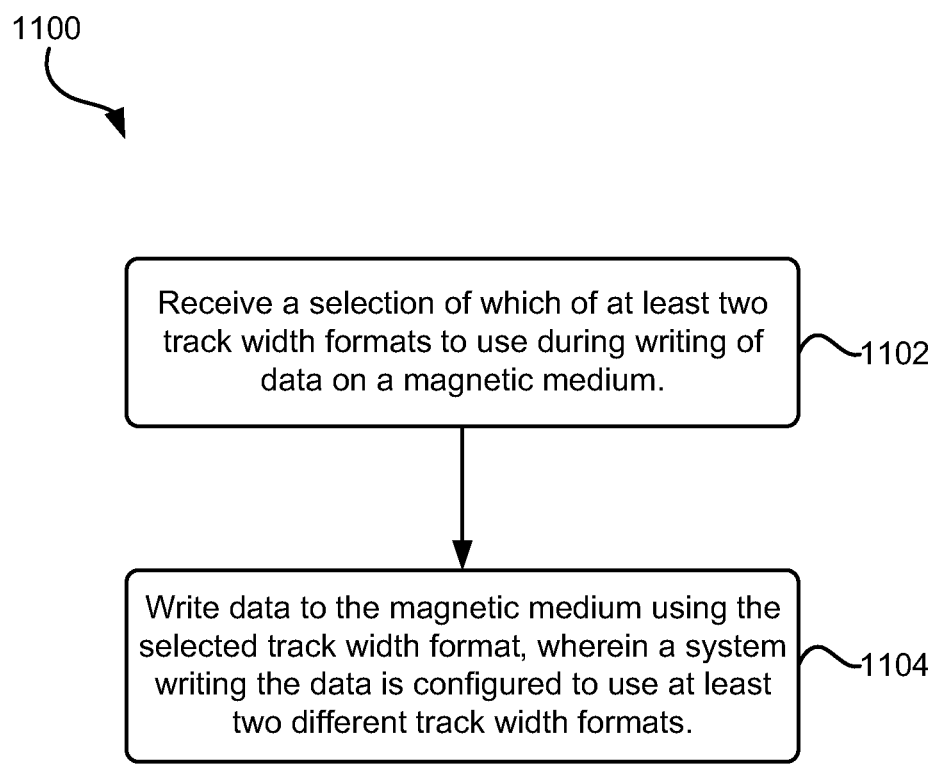
FIG. 11 illustrates a flowchart of a method according to one embodiment.

Now referring to FIG. 11, a method 1100 for writing data to a magnetic medium is shown in accordance with one embodiment. As an option, the present method 1100 may be implemented in conjunction with features from other embodiments listed herein, such as those described with reference to the other FIGS. Of course, however, such method 1100 and others presented herein may be used in various applications and/or permutations, which may or not be specifically described in the illustrative embodiments listed herein. Moreover, more or less operations than those shown in FIG. 11 may be included in method 1100, according to various embodiments.

As shown in FIG. 11 according to one approach, the method 1100 includes receiving a selection of which of at least two track width formats to use during writing of data on a magnetic medium. See operation 1102. The method 1100, also includes writing data to the magnetic medium using the selected track width format. See operation 1104. Furthermore, the system writing the data is configured to use at least two different track width formats.

In one embodiment, the track width format is selected based on at least one of a vibrational factor and a tape dimensional stability factor. In some approaches, the vibrational factor may include, but is not limited to, actual and/or historical readings, PES, PES sigma, etc. In other approaches, the tape dimensional stability factor may include, but is not limited to, actual and/or historical humidity variations, temperature variations, etc.

Figure 12:
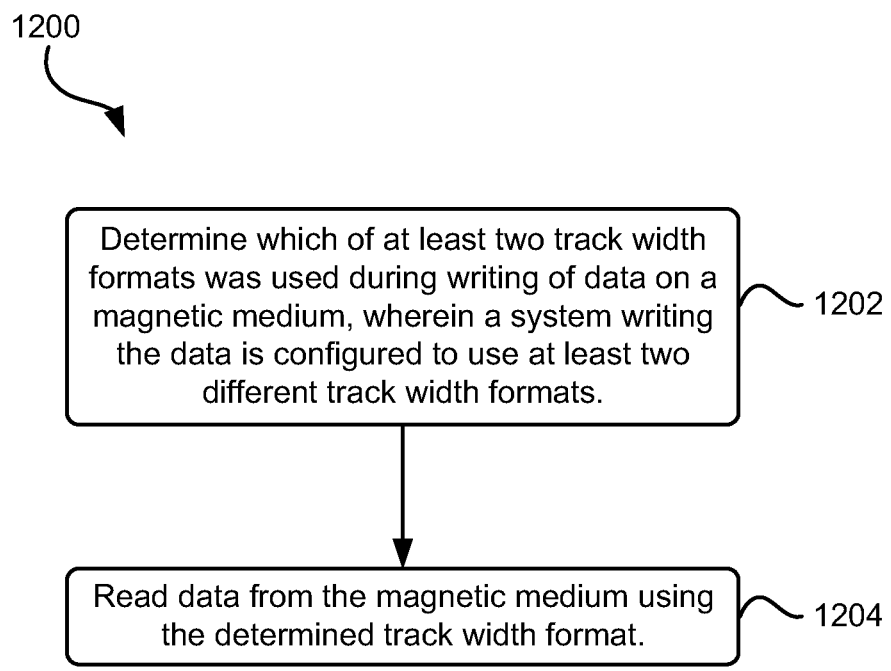
FIG. 12 illustrates a flowchart of a method according to one embodiment.

Now referring to FIG. 12, a method 1200 for reading data from a magnetic medium is shown in accordance with one embodiment. As an option, the present method 1200 may be implemented in conjunction with features from other embodiments listed herein, such as those described with reference to the other FIGS. Of course, however, such method 1200 and others presented herein may be used in various applications and/or permutations, which may or not be specifically described in the illustrative embodiments listed herein. Moreover, more or less operations than those shown in FIG. 12 may be included in method 1200, according to various embodiments.

As shown in FIG. 12 according to one approach, the method 1200 includes determining which of at least two track width formats was used during writing of data on a magnetic medium. See operation 1202. The method 1200 additionally includes reading data from the magnetic medium using the determined track width format. See operation 1204. Moreover, the system writing the data is configured to use at least two different track width formats.

It will be clear that the various features of the foregoing systems and/or methodologies may be combined in any way, creating a plurality of combinations from the descriptions presented above.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (e.g., CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example through the Internet using an Internet Service Provider (ISP).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart(s) and/or block diagram block or blocks.

It will be further appreciated that embodiments of the present invention may be provided in the form of a service deployed on behalf of a customer.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic tape-based storage system, comprising:
a magnetic head;
a drive mechanism for passing a magnetic recording tape over the magnetic head; and
a controller electrically coupled to the magnetic head,
wherein the system is configured to use at least two different track width formats,
wherein which of the at least two different track width formats used by the system during reading and/or linear writing of data is selectable based on at least one detected environmental condition, the environmental condition including at least one of a vibrational factor and a tape dimensional stability factor, the environmental condition being detected by one or more sensors operatively coupled to the system,
wherein the system is configured to write a plurality of data tracks in only one of the track width formats at a same time such that each of the data tracks written at the same time has a track width that is substantially the same.

2. A magnetic tape-based storage system as recited in claim 1, wherein at least one of the track width formats is established by a shingling distance of adjacent tracks.

3. A magnetic tape-based storage system as recited in claim 1, wherein all data in a partition on the magnetic recording tape is written in a first of the track width formats, wherein all data in a second partition of the magnetic recording tape is written in a second of the track width formats.

4. A magnetic tape-based storage system as recited in claim 1, wherein which of the at least two different track width formats used by the system during reading and/or linear writing of data is selectable by the system and/or a user.

5. A magnetic tape-based storage system as recited in claim 1, wherein the system is configured to write the plurality of data tracks on the magnetic recording tape in a shingled format along a straight line, wherein the at least two track width formats have different shingled track pitches with respect to one another.

6. A magnetic tape-based storage system as recited in claim 1, further comprising logic configured to:
determine which track width format a previously-written magnetic medium is written in; and
store on the magnetic recording tape which track width format at least a portion of the magnetic recording tape is written in.

7. A magnetic tape-based storage system as recited in claim 1, wherein the system is configured to simultaneously write the plurality of data tracks in only one of the track width formats at the same time.

8. A magnetic tape-based storage system as recited in claim 1, wherein the track width format used by the system during linear writing of the plurality of data tracks is not contrary to the detected environmental condition.

9. A magnetic tape-based storage system as recited in claim 1, wherein the system is configured to output an alert when the track width format selected for use by the system during reading and/or linear writing of data is contrary to the detected environmental condition.

10. A magnetic tape-based storage system as recited in claim 1, wherein the detected environment condition is selected from a group consisting of: humidity, shock, vibration, and combinations thereof.

11. A magnetic tape-based data storage system, comprising:
   a magnetic head;
   a drive mechanism for passing a magnetic recording tape over the magnetic head; and
   a controller electrically coupled to the magnetic head,
   wherein the system is configured to use at least two different track width formats,
   wherein which of the at least two different track width formats used by the system during reading and/or linear writing of data is selectable,
   wherein the system is configured to simultaneously write a plurality of data tracks in only one of the track width formats at a same time such that each of the data tracks written at the same time has a track width that is substantially the same,
   wherein the system is configured to output an alert when a track width format is selected that is contrary to at least one detected environmental condition, the environmental condition including at least one of a vibrational factor and a tape dimensional stability factor, the environmental condition being detected by at least one sensor operatively coupled to the system.

12. A magnetic tape-based data storage system as recited in claim 11, wherein at least one of the track width formats is established by a shingling distance of adjacent tracks.

13. A magnetic tape-based data storage system as recited in claim 11, wherein all data in a partition on the magnetic recording tape is written in a first of the track width formats, wherein all data in a second partition of the magnetic recording tape is written in a second of the track width formats.

14. A magnetic tape-based data storage system as recited in claim 11, wherein which of the at least two different track width formats used by the system during reading and/or linear writing of data is selectable by the system and/or a user.

15. A magnetic tape-based data storage system as recited in claim 11, further comprising logic configured to determine which track width format a previously-written magnetic recording tape is written in.

16. A magnetic tape-based data storage system as recited in claim 11, further comprising logic configured to store on the magnetic recording tape which track width format at least a portion of the magnetic recording tape is written in.

17. A method of writing data to a magnetic recording tape, comprising:
   receiving a selection of which of at least two track width formats to use during linear writing of data on the magnetic recording tape, wherein the track width format is selected based on at least one of a vibrational factor and a tape dimensional stability factor;
   and
   simultaneously writing a plurality data tracks to the magnetic recording tape using only one of the selected track width formats at a same time such that each of the data tracks written at the same time has a track width that is substantially the same; and
   wherein a system writing the data is configured to use at least two different track width formats.

18. A method of reading data from a magnetic recording tape, comprising:
   determining which of at least two track width formats was used during linear writing of data on a magnetic medium recording tape based on information obtained from at least one of a cartridge memory, a header of the magnetic recording tape, and a bar code; and
   reading the data from the magnetic recording tape using the determined track width format,
   wherein which of the at least two different track width formats used during linear writing of the data on the magnetic recording tape is selectable based on at least one detected environmental condition, the environmental condition including at least one of a vibrational factor and a tape dimensional stability factor,
   wherein all tracks on the magnetic recording tape having the determined track width format have about a same track width.

19. A method as recited in claim 18, wherein the determining which of at least two track width formats was used during linear writing of data on the magnetic recording tape is based, at least in part, on information obtained from the header of the magnetic recording tape.

* * * * *